June 2, 1942.  A. B. McGINNIS  2,285,297
PRESS MECHANISM FOR FORMING SCREW-THREADED PLASTIC ARTICLES
Filed Feb. 18, 1941  3 Sheets-Sheet 1

INVENTOR
Archibald B. McGinnis
by Christy, Parmelee and Strickland
his attorneys

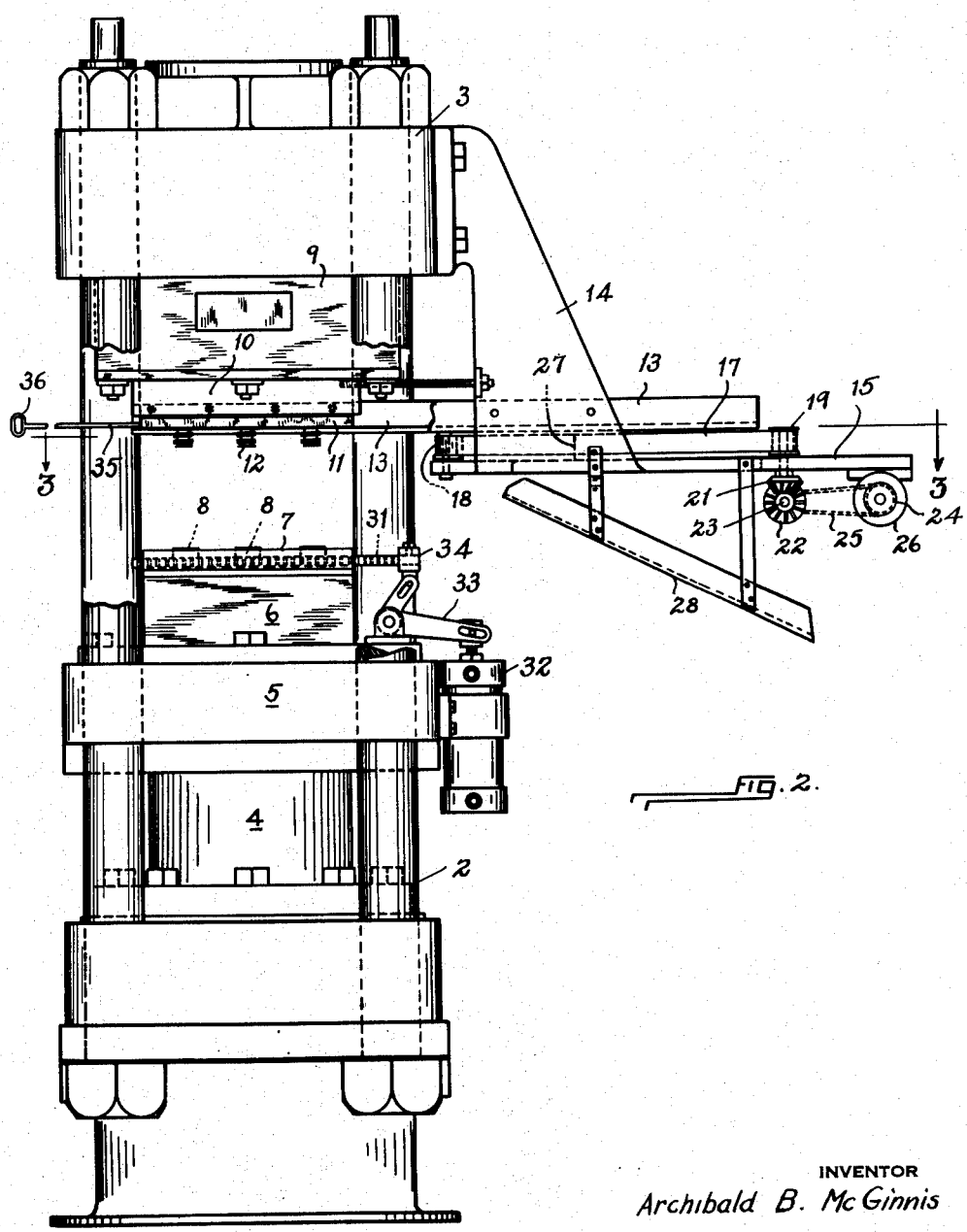

June 2, 1942.  A. B. McGINNIS  2,285,297
PRESS MECHANISM FOR FORMING SCREW-THREADED PLASTIC ARTICLES
Filed Feb. 18, 1941  3 Sheets-Sheet 3
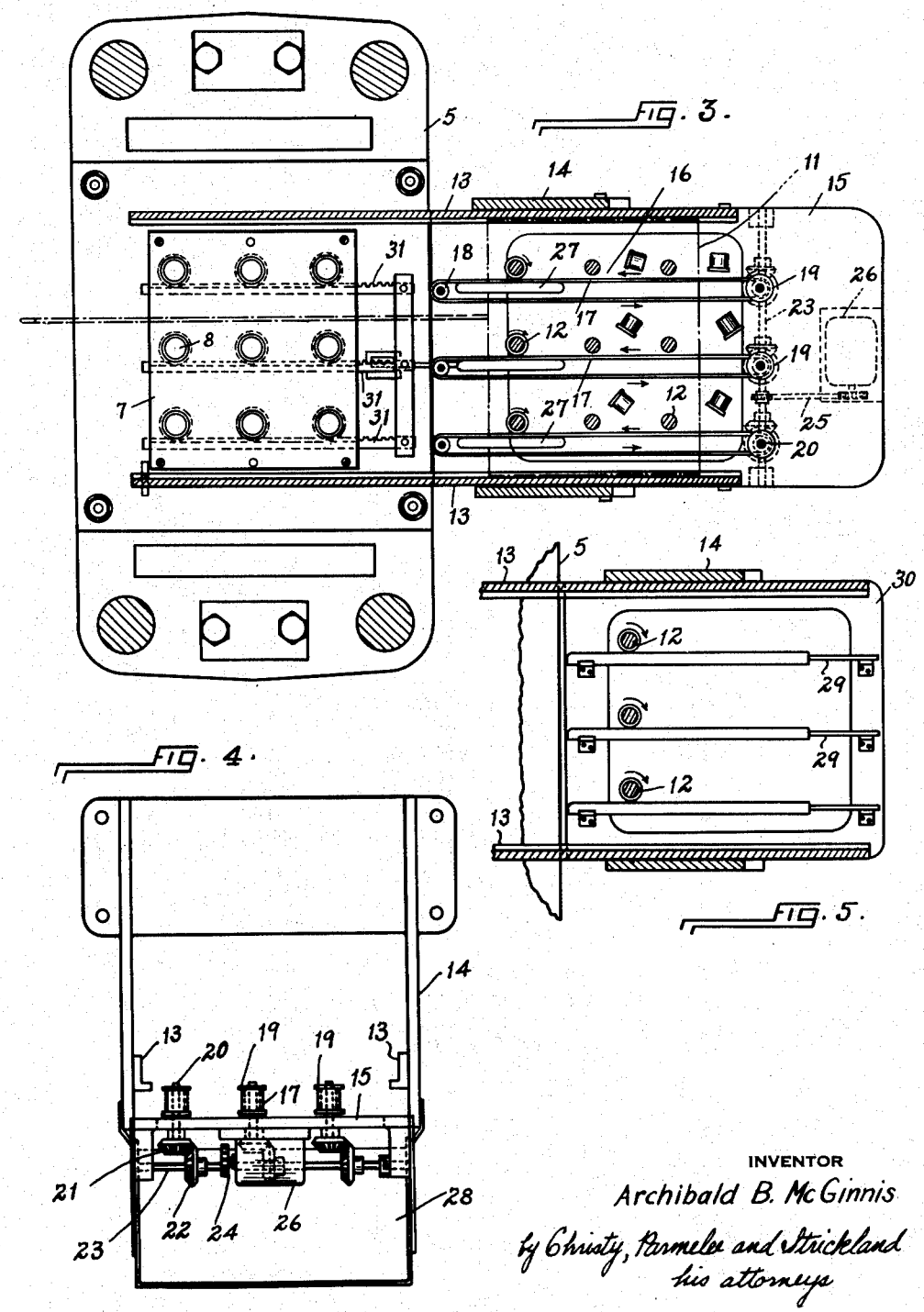
INVENTOR
Archibald B. McGinnis
by Christy, Parmelee and Strickland
his attorneys Patented June 2, 1942

2,285,297

UNITED STATES PATENT OFFICE 2,285,297

PRESS MECHANISM FOR FORMING SCREW-THREADED PLASTIC ARTICLES

Archibald B. McGinnis, Wheeling, W. Va., assignor to Wheeler Stamping Company, Wheeling, W. Va., a corporation of West Virginia Application February 18, 1941, Serial No. 379,435

9 Claims. (Cl. 18—16)

This invention pertains to the manufacture of articles from plastic materials, the term plastics comprehending synthetic resins and other molten compounds, and is for a press mechanism for the manufacture of articles which are screw-threaded, such, for example, as closure caps, vials and threaded knobs or ferrules.

The invention will be particularly described in connection with the manufacture of screw-threaded closure caps, but this is merely by way of illustration. Closure caps and like articles are usually molded on multiple presses. In such presses there are a number of similar mold parts in order that several articles may be produced in each operating cycle of the press. Because of a screw-thread being molded into the article, the article has a threaded engagement with one of the mold parts when the molding operation is finished, and the present invention pertains particularly to the removal of the formed article after the molding cycle has been otherwise completed.

In the molding of plastic caps there is commonly provided a press having a fixed upper mold member with a plurality of force pins thereon which are externally threaded to form the internal threads of the caps. There is a reciprocable lower mold plate having a number of cavities therein which cooperate with the force pins. In the operation of molding the plastic material is charged into the cavities of the lower mold plate while the press is opened. The press is then closed to form the articles and when the press opens the formed articles adhere to the force pins on the upper mold plate. They are subsequently removed from these force pins by unscrewing them. Heretofore it has been proposed to unscrew the articles by turning the force pins, as disclosed, for example, in Rahm Patent No. 1,944,571, but in order to hold the cap stationary while the force pin is being unscrewed part of the mold cavity is formed in the upper plate of the press, thus requiring the machining of divided molds. It has also been proposed, as disclosed for example in the patent to Matson, No. 2,047,379, dated July 14, 1936, to turn the cavity members in the lower mold plate as the press is opening so as to completely unscrew the caps from the force pins before the mold plates have completely separated. With this arrangement the caps remain in the cavities and an ejecting mechanism has to be provided to subsequently remove the caps from the cavities. A third expedient involves the provision of a stripping mechanism which is normally positioned to one side of the press and which, upon the opening of the press, is moved into the space between the upper and lower platens to engage the articles on the force pins and remove them. Such an arrangement is provided, for example, in Scott Patent No. 2,226,326, dated December 24, 1940. In addition to this, combinations of the foregoing systems have been developed wherein partial removal of the caps is effected by relative rotation of the force pins and cavities followed by the movement of a stripper which is normally positioned to one side of the press into the space between the press platens for completing the unscrewing operation, this stripper being arranged to carry away the caps as they are unscrewed from the force pins. In some cases, as shown for example in my copending application Serial No. 379,436, filed February 18, 1941, such a stripper is attached to the bottom mold plate and a slideway is provided by means of which the bottom mold plate may be slid horizontally from between the press platens, this movement causing the stripper to be moved into the space between the platens. The bottom mold member is slid forwardly sufficiently far so that the caps which are removed by the stripper fall into a hopper at the front of the press.

The arrangement last described is quite satisfactory except that the operator's station in front of the press is obstructed by all of the attendant mechanism and by the provision of the hopper at the front of the press and his working position is removed several feet to the front of the press. This arrangement also requires the attachment of considerable mechanism to the movable platen of the press, all of which has to go up and down with the movable platen. Finally the arrangements heretofore provided are likely to result in the dropping of flash into the mold cavities, especially where the mold cavities are not movable horizontally during the stripping operation.

The present invention is designed to overcome the disadvantages of the previous arrangements. In general the present application contemplates the provision of a stripping means in a fixed position on the press at one side of the press with a guideway on the press in which the upper mold member may be shifted horizontally from a working position between the platens of the mold to a stripping position where the force pins engage the fixed stripper. The caps are thus stripped at one side of the press where they can drop directly into a hopper or other receiving means. Any flash which is removed drops in a position where it is entirely clear of the lower mold member. The stripping can be accomplished at the back of the press instead of at the front so that the operator can be stationed closer to the front of the press. Floor space is conserved by the arrangement and the whole mechanism is simplified because of the fewer parts that have to be arranged to move up and down with the lower press platen.

The invention may be fully understood by reference to the accompanying drawings in which—

Figure 2 is a side elevation with a portion of the press frame broken away;

Figure 3 is a horizontal section in substantially the plane of line 3—3 of Figure 2;

Figure 4 is an end elevation of the stripper detached from the press; and

Figure 5 is a fragmentary view generally similar to Figure 3, but illustrating a modified form of stripper.

Figure 1:
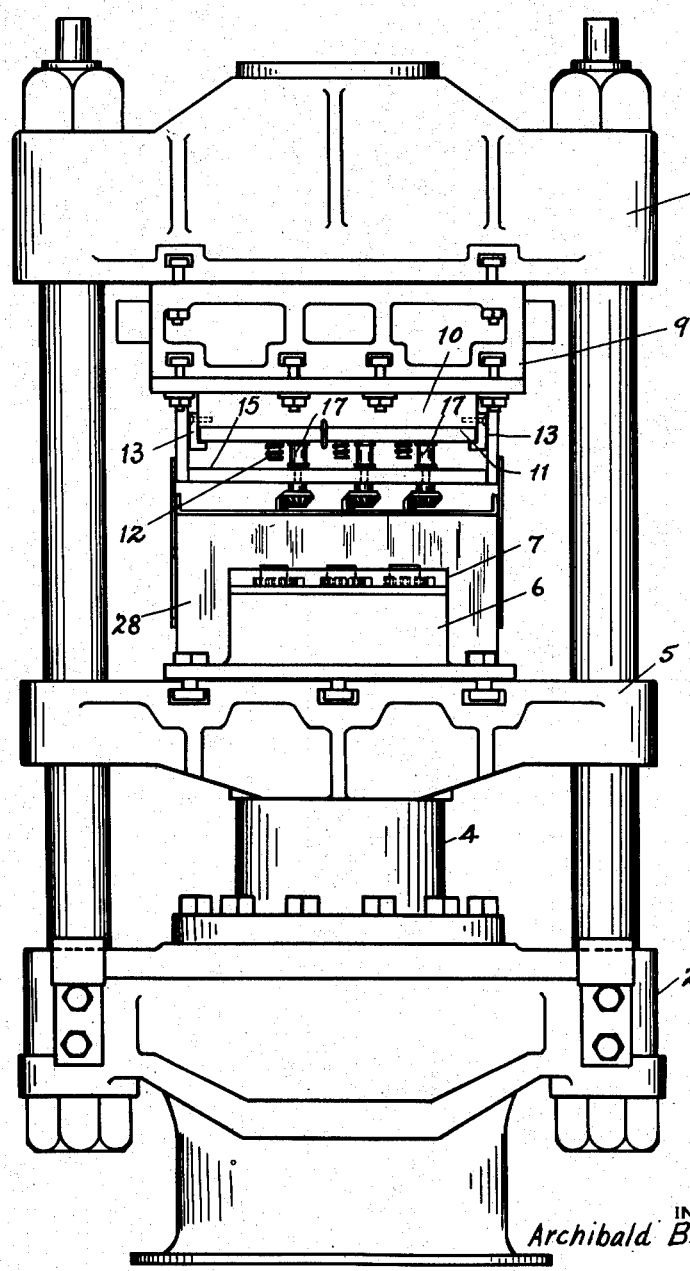
Figure 1 is a front elevation of a press equipped for my invention.

Referring first to Figures 1 to 4 of the drawings, 2 designates a press of conventional form having a fixed head 3 at the top thereof and having a ram 4 for raising and lowering the movable bed 5. On the bed 5 is a bed-plate 6 to the top of which is attached a mold plate 7 having a plurality of mold cavities therein, these cavities being designated 8.

Suspended from the fixed crosshead 3 is a fixed support 9 to which is secured a bed-plate 10. Below the bed-plate 10 is an upper mold plate 11 having a plurality of mold elements 12 thereon which are threaded for the purpose of forming threads in the article to be molded, these mold elements 12 in the particular embodiment of the invention illustrated comprising force pins. When the hydraulic ram 4 is operated to raise the lower mold, the force pins 12 are projected into the cavities 8, the force pins cooperating with the cavities to produce an internally threaded cap from the plastic charge which is first placed in each mold cavity.

Instead of the mold plate 11 being bolted to the bedplate 10 and being fixed with respect thereto as has heretofore been the practice, this plate is supported along each edge on angle-shaped guide bars or rails 13 that extend along each side of the bed-plate 10 and which project beyond the frame of the press as shown in Figure 2, these guides or rails forming a slidable support along which the mold plate 11 may be slid. Referring to Figure 2 which shows a side elevation of the press, the operator normally stands to the left of the structure and this therefore will be designated the front of the press and the rails 13 project laterally to the rear of the press. The rails 13 are rigid, and they are rigidly bolted to the bed-plate 10 of the machine.

Bolted to the rear of the press is a rigid bracket 14 that supports a horizontal frame 15. The horizontal frame 15 has a plurality of parallel stripping elements designated generally as 16 on the upper face thereof. These stripping elements have friction surfaces and they are spaced corresponding to the spacing of the rows of force pins on the upper mold plate so that when the mold plate is moved from its normal working position rearwardly along the guide, the molded articles on the force pins will be frictionally engaged by the strippers 16 and unscrewed. If, as shown in Figure 3, there are three rows of force pins, there are three of the stripping elements 16. The number of rows of force pins, of course, depends on the size of the press and the size of the articles to be formed, and three have been mentioned only as illustrating the invention. In Figures 1 to 4 is shown a form of the invention in which the stripping elements 16 each comprise an endless belt 17. These belts are stretched taut. At one end the belts pass over a guide pulley 18 and at the other end the belts pass around a driving pulley 19. Each driving pulley 19 is carried on a spindle 20. The belts may all be driven from a single source of power, each spindle 20 having a pinion 21 thereon which meshes with a corresponding bevel gear 22 on a shaft 23 under the plate 15. The shaft 23 is driven through sprocket 24 and chain 25 by a small motor 26. When the motor is operated all of the belts are driven at the same speed and in the same direction. For holding the belts in contact with the formed pieces on the mandrels the frame 15 may be provided with back-up plates 27 that extend along the reach of the belt which engages and unscrews the articles. These back-up plates usually need to be relatively short as the unscrewing of the caps preferably occurs progressively as the upper mold plate is slid rearwardly. However, the invention contemplates that the mold plate might be moved all the way out before the belts are operated. In any event the molded articles which adhere to the threaded force pins are frictionally engaged by the strippers by reason of relative movement between the strippers and the articles on the force pins. The articles which are unscrewed from the force pins may drop through the frame 15 onto a chute or apron 28 that is suspended below the frame and which is preferably inclined to direct the molded articles into a receptacle (not shown).

The friction belts are preferably used where the articles adhere firmly to the force pins. Where it is not necessary or desirable to use driven belts the arrangement shown in Figure 5 may be employed. In this modification the stripping elements comprise fixed parallel bars 29 having rubber or other friction material thereover, the bars being so spaced that when the mold plate is moved out from under the press frame toward a position over the supporting frame 30 the molded articles on the force pins will be turned through their engagement with the friction surfaces on the bars. In this case, as in the preceding embodiment, the articles are unscrewed by reason of relative motion between the force pins and the friction elements.

Some molded articles may be of a shape such that they will not be unscrewed by the friction strippers as above described unless they are first loosened on the force pins, or they may adhere so tightly to the force pins as to require loosening before they are engaged by the friction strippers. Where this is necessary or desirable means may be provided for effecting a limited relative rotation between the cavity elements and the force pins at a time when the mold is just beginning to open and while the articles are still engaged by both the force pins and the cavities. One mechanism for effecting such relative movement is illustrated in the drawings. This mechanism as shown comprises the provision of a number of parallel racks 31 which are slidably received in the lower mold plate 7. Each cavity element 8 of the mold has teeth on the periphery thereof, these teeth engaging the racks 31. When the racks are reciprocated the cavity elements are rotated. A slight reciprocation of the racks will suffice to loosen the molded articles from the threaded portion of the mold to which they adhere. For reciprocating the racks there is a fluid pressure cylinder 32 which operates a crank 33, this crank in turn being connected with a crosshead 34 to which the several racks 31 are attached. The cylinder 32 is operated through valves (not shown) by a source of fluid pressure and in the operation of the press the movement of the racks is effective at a time when the press is just beginning to open.

From the foregoing description it will be seen that the present invention provides a novel mechanism for removing threaded pieces from the mold parts on which they are formed and with which they have a threaded connection. The stripping and ultimate removal of the pieces is accomplished merely by shifting the upper mold plate horizontally from the normal operating position to a position externally of the press. The stripping mechanism may be located entirely to the rear of the press so that the front of the press is not obstructed. Moreover, this stripping mechanism does not have to move up and down with the press, further simplifying its construction.

For shifting the upper mold plate horizontally I have shown an operating rod 35 attached to the front edge of the upper mold plate 11 and which has an operating handle 36 thereon, but it will be understood that instead of a manual operating means being provided the movement of this upper plate may be effected through mechanical means. The handle 36 is accessible at the front of the press where it is most convenient.

While I have illustrated and described certain present preferred embodiments of the invention it will be understood that various changes and modifications may be made in the machine within the contemplation of my invention and under the scope of the following claims.

I claim:

1. The combination with a press having upper and lower mold members for the forming of screw-threaded plastic articles one of said members being movable vertically into and out of cooperative engagement, one of said members having a screw-threaded engagement with the article which is formed, of a trackway along which the members to which the article have screw-threaded engagement is movably supported and along which it may be moved relatively to the other press member from its position in the press to a position at one side of the press, and a stripper at the side of the press into engagement with which said member is brought when it is so moved for unscrewing the formed article from the member on which it is formed.

2. Molding apparatus for the forming of screw-threaded plastic articles comprising a press member having a plurality of mold elements thereon adapted to have a screw-threaded engagement with the articles which are formed, a second mold member for cooperating with the first, a trackway along which the first member is mounted for movement in a horizontal plane from a normal position over the second member to a stripping position laterally offset from the second member, and stripping means in the path of movement of the first member when it is so moved along the trackway for engaging articles on the first member and unscrewing them.

3. Molding apparatus for molding screw-threaded plastic articles comprising a press, a mold plate on the press having a plurality of mold elements thereon, each of which is adapted to have a screw-threaded engagement with the article formed thereby, a second cooperating mold plate under the first having a plurality of mold elements therein for cooperating with mold elements on the first, means on the press providing a trackway for slidably supporting the first-named plate whereby said first-named plate may be moved from a position over the second plate to a position at one side of the press, and means in the path of movement of said plate as it moves horizontally from one position to the other and to one side of the registering portion of said plates for unscrewing formed articles on the mold elements of said plate.

4. Molding apparatus of the class described comprising a press having an upper plate and a lower plate, one of which is movable vertically with respect to the other, the upper plate having a plurality of mold elements thereon cooperating with the mold elements in the lower plate and which upper plate mold elements have a screw-threaded engagement with articles formed thereby, means for slidably supporting said upper plate whereby it may be moved horizontally from a position where it is over the lower plate to a position where it is to one side of the press, and means at one side of the press for unscrewing the articles which adhere to said mold elements when the upper mold plate is so moved to the side of the press.

5. Molding apparatus comprising a press having opposed plates, one of which is movable toward and away from the other, said plates having a multiple of complementary mold elements thereon, the elements on one of said plates being adapted to have a screw-threaded engagement with the molded articles, means for moving the last-mentioned plate in a plane and a stripper at one side of the press operative to unscrew molded articles from the mold elements thereof when the mold plate is so moved from a position opposite the other plate to a position at the side of the press.

6. Molding apparatus comprising a press having upper and lower mold plates with a multiple of complementary mold elements thereon, the elements on the upper plate being adapted to have a screw-threaded engagement with the molded articles, said upper plate being movable in a plane from a position over the lower plate to a position at one side of the press, means for so moving the upper plate, and a stripper at one side of the press operative to frictionally engage and unscrew molded articles therefrom when the mold plate is so moved.

7. Molding apparatus comprising a press having a fixed mold plate at the top thereof and a vertically movable cooperating mold plate under the first, said upper plate having a plurality of rows of mold elements thereon which have a screw-threaded engagement with the molded articles produced on the press, the lower plate having complementary rows of mold elements thereon, a guideway in the press along which the upper plate may be moved in a horizontal plane from a position over the lower plate to a position out of vertical alinement with the lower plate, and a stripper to one side of the lower mold plate having parallel stripping elements for engaging the articles on the rows of mold elements when the upper plate is so moved.

8. Molding apparatus comprising a press having a fixed mold plate at the top thereof and a vertically movable cooperating mold plate under the first, said upper plate having a plurality of rows of mold elements thereon which have a screw-threaded engagement with the molded articles produced on the press, the lower plate having complementary rows of mold elements thereon, a guideway in the press along which the upper plate may be moved in a horizontal plane from a position over the lower plate to a position out of vertical alinement with the lower plate, and a stripper having parallel stripping elements for engaging the articles on the rows of mold elements when the upper plate is so moved, the stripping elements having friction surfaces thereon for engaging the peripheral surfaces of the articles on the rows of mold elements and removing them by frictional engagement therewith.

9. Molding apparatus comprising a press having a fixed mold plate at the top thereof and a vertically movable cooperating mold plate under the first, said upper plate having a plurality of rows of mold elements thereon which have a screw-threaded engagement with the molded articles produced on the press, the lower plate having complementary rows of mold elements thereon, a guideway in the press along which the upper plate may be moved in a horizontal plane from a position over the lower plate, a stripper having parallel stripping elements for engaging the articles on the rows of mold elements when the upper plate is so moved, the stripping elements having friction surfaces thereon for engaging the peripheral surfaces of the articles on the rows of mold elements and removing them by frictional engagement therewith, and means for moving the stripping elements relatively to the article.

ARCHIBALD B. McGINNIS.